Jan. 17, 1950   D. L. FORREST   2,494,698
ADJUSTABLE CUTTING TORCH HOLDER
Filed Sept. 24, 1945   3 Sheets-Sheet 1
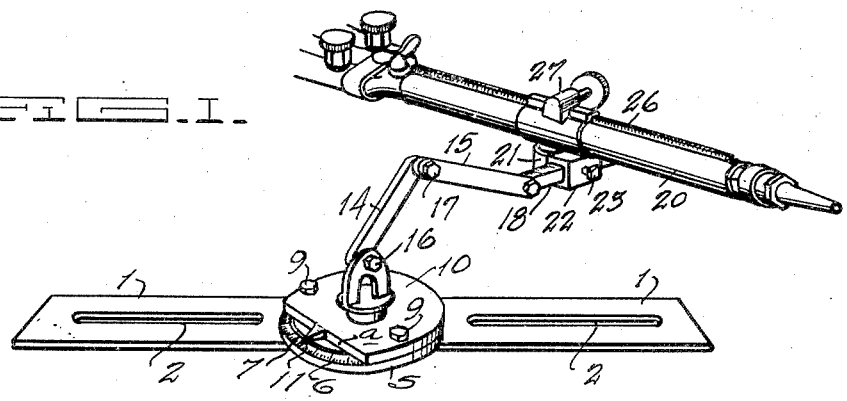
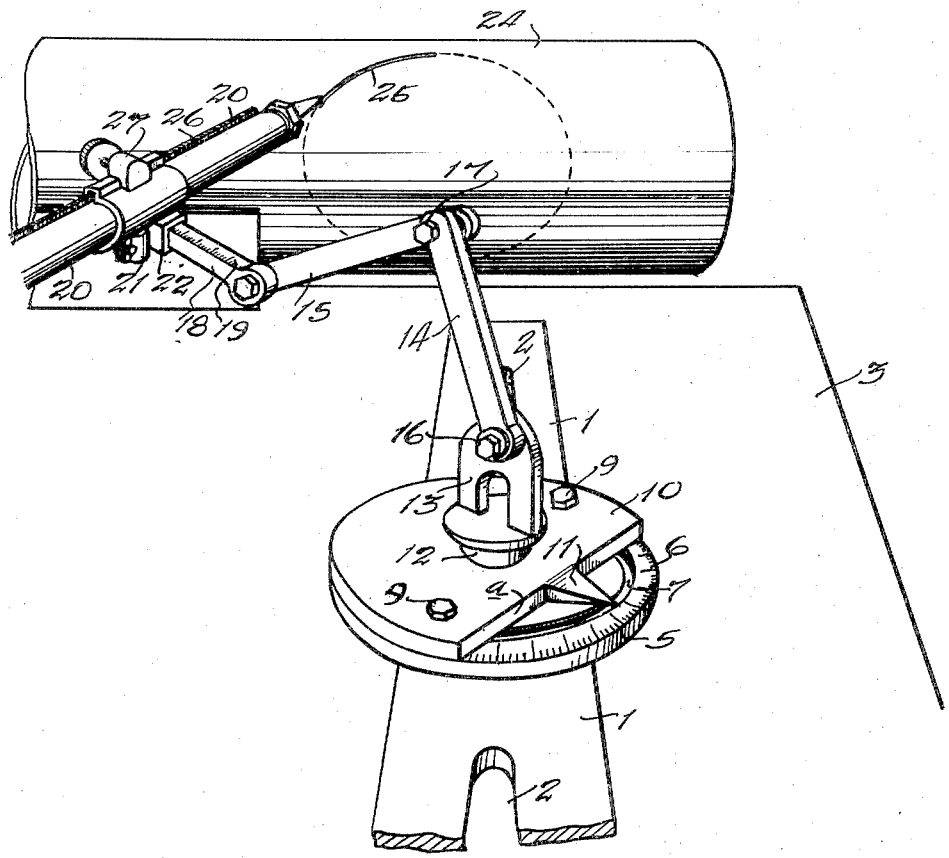
DONALD L. FORREST
INVENTOR.
BY Cecil L. Wood
ATTORNEY

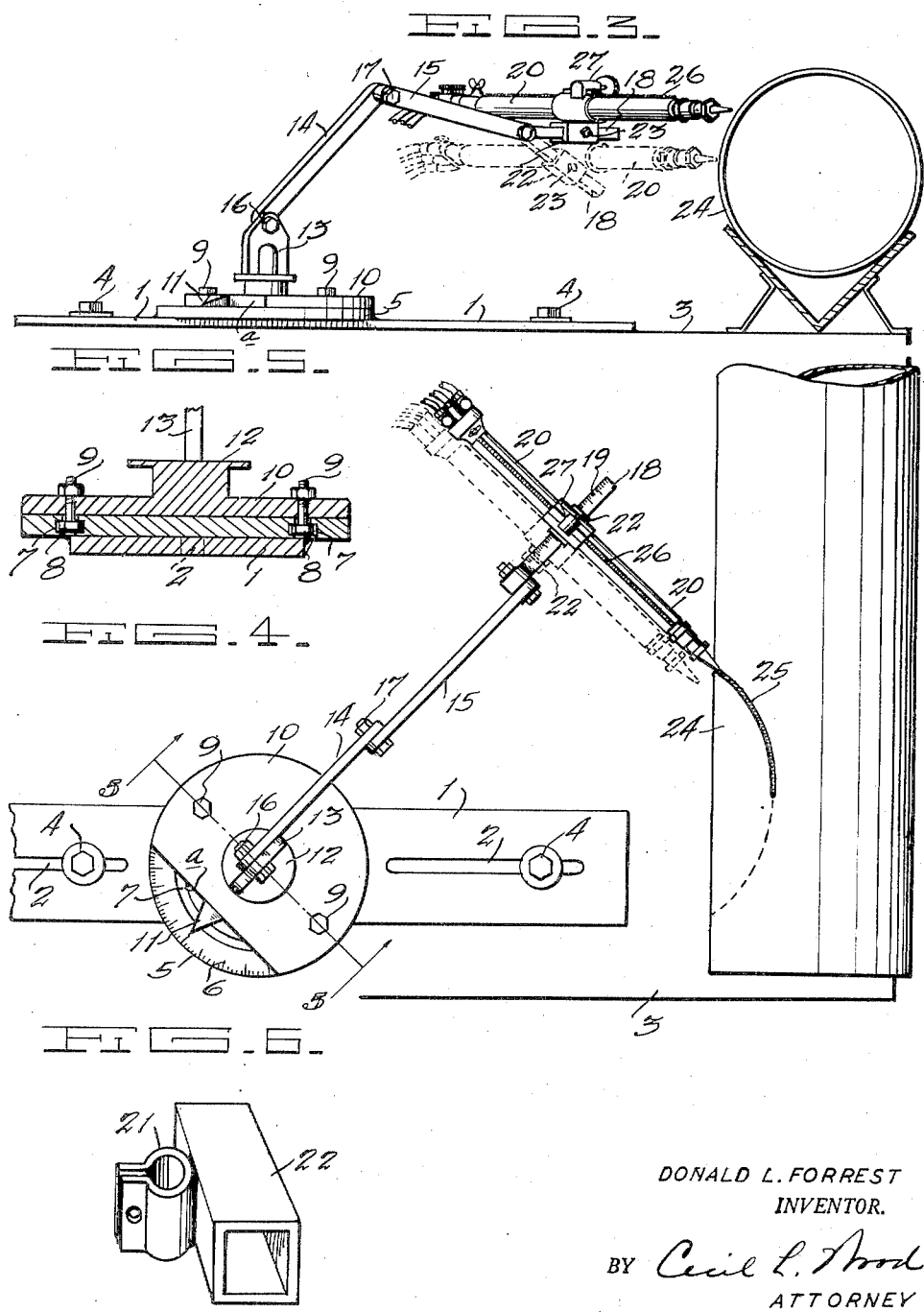

Jan. 17, 1950 D. L. FORREST 2,494,698
ADJUSTABLE CUTTING TORCH HOLDER
Filed Sept. 24, 1945 3 Sheets-Sheet 3
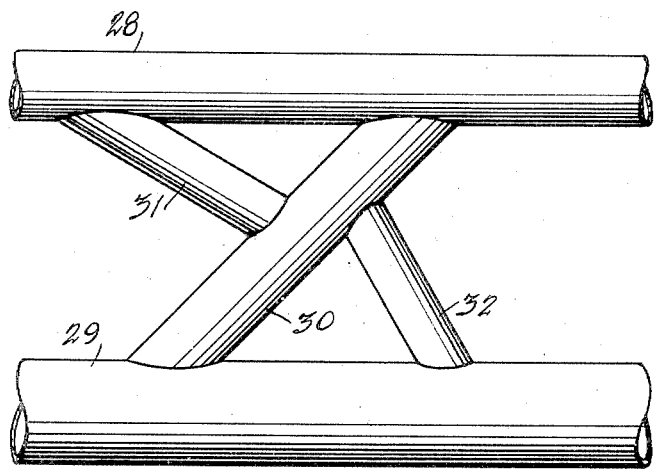
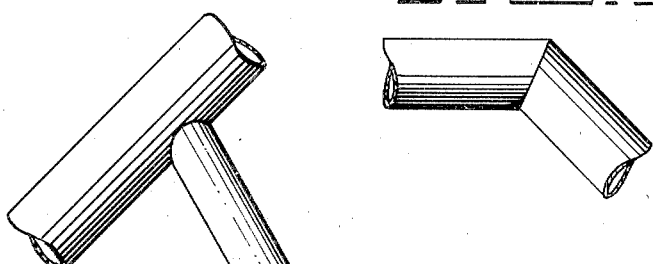
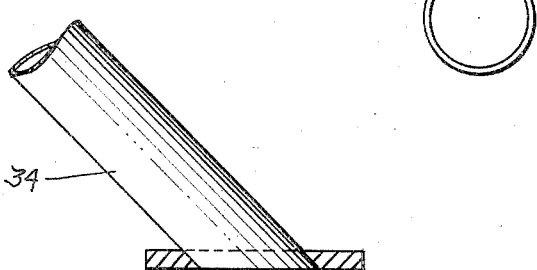
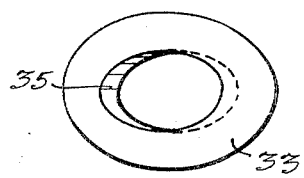
DONALD L. FORREST
INVENTOR.
BY *Cecil L. Wood*
ATTORNEY Patented Jan. 17, 1950

2,494,698

UNITED STATES PATENT OFFICE 2,494,698

ADJUSTABLE CUTTING TORCH HOLDER

Donald L. Forrest, Fort Worth, Tex., assignor of five per cent to Fort Worth Structural Steel Company, Fort Worth, Tex., a corporation of Texas Application September 24, 1945, Serial No. 618,299

5 Claims. (Cl. 248—278)

This invention relates to adjustable holding apparatus for acetylene cutting torches and it has particular reference to holding devices for torches used in cutting various angles on pipe and tubing, or the like, and its principal object resides in the provision of apparatus whereby pipe or tubing may be cut on any desired angle for joining, as in truss work, and wherein pipe or tubing of different diameters can be perfectly joined at varying angles without the use of patterns, templates, or the like.

Another object of the invention resides in the provision of a cutting torch holder whereby steel plate, as well as pipe or tubing, can be cut on any desired angle or bevel, including arcs, without the use of patterns or templates thus enabling any skilled person to perform such operations without resorting to intricate mathematical calculations ordinarily required in determining and laying out the work in degrees of angulation, and the like.

An object of the invention is that of providing an instrument for adjustably holding a cutting torch in the proper angular relation to the work to which it is applied by simply adjusting the device in advance in accordance with the predetermined angle to be cut and which may be indicated on a blue print or drawing before the operator.

Broadly, the invention seeks to comprehend the provision of a cutting torch holder which is capable of saving considerable time and expense in laying out and cutting angles, particularly on pipe and tubing of various diameters, and which is simple in design and construction and possesses great flexibility in operation.

While the foregoing objects are paramount, other and lesser objects will become manifest as the description proceeds, taken in connection with the appended drawings wherein:

Figure 1 shows the invention in perspective and illustrates the torch adjusted to a position for a 45 degree cut.

Figure 2 is another perspective view of the invention arranged upon a work table and illustrates the torch applied to the work at 45 degrees and illustrating the protractor and indicator.

Figure 3 is a perspective illustration of the invention showing the torch applied to the work at an angle and showing, in dotted lines, the varying positions of the torch in executing an arcuate cut as illustrated in Figures 2 and 4.

Figure 4 is a plan view of the invention showing the torch applied to the work at approximately 45 degrees and illustrating the graduated protractor and indicator and showing in dotted lines the varying positions of the torch in operation.

Figure 5 is a fragmentary cross-sectional illustration of the protractor and indicator assembly taken on lines 5—5 of Figure 4.

Figure 6 is a perspective illustration of the torch holder.

Figure 7 fragmentarily illustrates an example of angularly arranged struts in a truss structure in which the various angles of pipe ends and framing cuts are performed by the use of the invention.

Figure 8 illustrates another example of angular joints capable of execution by the use of the invention.

Figure 9 fragmentarily shows straight angular cuts joined at approximately 45 degrees, and Figures 10 and 11 illustrate angular or bevel cuts from steel plate for bases or caps for angular cut pipe or tubing.

It is common practice to provide patterns or templates for cutting pipe or tubing at the proper angles and contours to effect the proper joining at various angles of pipe and tubing of the same or different diameters. It has also been necessary to plot the proper angles and bevels for framing cuts into which lateral connections are made. The preparation of such patterns or templates generally involves much expert mathematical calculation and the consumption of much valuable time which is avoided by the use of the invention.

Accordingly, therefore, the invention comprises, primarily, a base plate 1 of suitable length to afford a proper adjustment of the assembly to the work. Slots 2 are provided longitudinally of the plate 1 whereby the same can be adjustably secured to a table 3, or the like, by such means as bolts 4, in a manner illustrated in Figures 3 and 4.

Substantially intermediate the ends of the base plate 1 is secured thereto, as by welding, a protractor disk 5 which has graduations 6 arranged about its upper perimeter representing degrees, the entire circular arrangement of graduations being 360 degrees. A circular groove 7 is formed in the upper face of the protractor disk 5 which is inverted T-shaped in section, as shown in Figure 5, to accommodate the heads 8 of bolts 9 which serve to adjustably and rotatably secure an indicator plate 10 to the protractor disk 5. The indicator plate 10, which is substantially circular in form and is preferably the same in diameter as the protractor disk 5, is straight along one side $a$ and has a pointer 11 integral with this portion which is directed toward the graduations 6.

An integral boss 12 is centrally arranged upon the indicator plate 10 and a substantially inverted U-shaped bracket 13 is integrally supported upon the boss 12, as shown in Figures 1, 2 and 3. The bracket 13 is arranged so that its legs are in alignment with the pointer 11 and thus provide for the pivotal attachment of supporting arms 14 and 15 to the bracket 13 so that longitudinally the arms 14 and 15 extend in the same plane with the pointer 11 but in an opposite direction.

The arm 14 is pivotally secured to the bracket 13 by a bolt 16, or the like, and the arm 15 is similarly secured to the outer end of the arm 14 by a bolt 17. These arms 14 and 15 are adjustable but are normally rigid, as will become manifest presently. At the outer end of the arm 15 is pivotally attached a bar 18 which is preferably provided with graduations 19 along one of its sides, the function of which will be presently described.

A conventional acetylene cutting torch 20 is employed with the invention by fitting the mounting pin thereof (not shown) into the split collar 21 integral with a square sleeve 22, shown in detail in Figure 6, which is slidably arranged upon the bar 18, in the manner shown in Figures 1, 2 and 3, and which may be fixed at any desired point along the length of the bar 18 and the graduations 19 thereon by a set screw 23.

In performing angular cuts, such as those illustrated in Figures 2 and 4, as well as those shown in Figures 7 to 11, inclusive, it is important that the torch 20 be arranged at right angles, or transversely to, the bar 18 and the arms 14 and 15, as in Figures 2, 3 and 4. Thus, when the indicator 11 is properly positioned and the plate 10 made secure, the torch 20 is arranged at the proper angle for the cut. The arms 14 and 15, being in alignment with the pointer 11, will be extended at the degree of angulation indicated by the pointer 11 on the protractor 5.

This arrangement is illustrated particularly in Figure 4 in which the pointer 11 is shown to be pointing to 45 degrees. It will be noted that the torch 20 is applied to the work 24 at an angle of 45 degrees. The torch is caused to move in an arcuate path 25, indicated in Figures 2 and 4, by moving the bar 18 on its pivot, as shown in dotted lines in Figures 3 and 4, while manipulating the torch 20 longitudinally by the conventional rack and pinion adjustment 26 and 27 to conform to the contour of the work 24. This movement is also indicated by the dotted line illustrations of the torch 20 in Figures 3 and 4.

In order to complete an angular framing cut, such as that illustrated in Figures 2 and 4, it will be necessary to make the left half of the cut in the manner shown in Figure 2 and turn the work 24 over endwise to finish the cut. This will be necessary in order to obtain the proper bevel along the edges of the cut which extend lengthwise of the work. This type of cut is referred to as a framing cut as employed in the main structural members 28, 29 and 30 of the truss structure illustrated in Figure 7.

In effecting the angular cuts on the ends of the laterals 31 and 32, as well as the member 30 of the structure shown in Figure 7, one side of the work is cut and the invention is moved to the other side, without changing the angle of the arms 14 and 15, nor the torch 20, and the other half is cut. Thus both sides of the cut is properly beveled at the desired angle and curve so that, when completed, the cut will accurately conform to both the angle and contour of the pipe to which it is designed to be applied.

Obviously, many types of angular cuts, not here possible to describe, may be performed by the use of the invention. An example of its use for cutting steel plate is illustrated in Figures 10 and 11 wherein is illustrated a base, or cap 33 for angular cut pipe 34. The bevel 35 may be of any desired angle determined by the setting of the pointer 11 at the proper reading of the graduations 6 on the protractor disk 5. The operation is performed by applying the torch to the work to make the left half of the cut and then turning the work around endwise for cutting the other half. Thus the bevels on each end of the cut will be in the same diagonal plane as in Figures 10 and 11.

In adjusting the invention for operation the arms 14 and 15 are positioned so that the pivot 17 is in a horizontal plane with the longitudinal axis of the pipe to be cut. The diameter of the arcuate cut 25 is determined by the position of the sliding sleeve 22 longitudinally of the bar 18 along the graduations 19 thereon.

Manifestly, certain changes and modifications may be resorted to from time to time without departing from the spirit and intent of the invention or the scope of the appended claims.

What is claimed is:

1. In a cutting torch holder for angular cuts on pipe and tubing, a slotted base plate adapted for adjustable securement to a table, a circular base member having a circular groove formed in its face and a radial arrangement of graduations adjacent to said groove, an indicator plate pivotally superposed upon the said base member and adjustably securable thereto, a bracket integrally supported centrally of the said indicator plate, a plurality of pivotally connected arms secured to the said bracket and capable of fixed angular adjustment with respect thereto and to each other, a torch holder bar having graduations thereon pivotally connected to the outermost of the said arms, a torch holder slidably adjustable with respect to the said graduations along the said bar, said holder being capable of horizontal pivotal adjustment with respect to said bar.

2. In a torch holder for angular cuts on pipe and tubing, a slotted base plate adapted for securement to a bench, a base member comprising a securing plate having a protractor scale on its upper face, an indicator disk pivotally superposed upon the said protractor and adapted to fixed adjustments thereon, a plurality of longitudinally and pivotally connected torch supporting arms having pivotal connection with said indicator disk, the said arms being capable of fixed angular adjustments with respect to each other and the said base member, a graduated torch bar pivotally secured to the end of the outermost of the said arms, a torch holder arranged for slidable adjustment on the said bar, the said torch holder being pivotal with respect to said bar.

3. In a torch holder for effecting angular cuts on pipe and tubing for trussing, and the like, in combination, a base comprising an adjustable securing plate adapted for attachment to a bench, a protractor disk adjustably secured to said plate and formed with a circular groove in its face, an indicator disk having a pointer pivotally associated with the said protractor disk and adapted to fixed adjustments in said groove thereon, a plurality of pivotally connected arms having pivotal connection with the said indicator disk and capable of adjustment to various rigid angular positions with respect to said disk and in horizontal and vertical planes, a graduated bar pivotally connected to the outermost of the said arms, a torch holder slidably arranged on the said bar and capable of fixed adjustment longitudinally thereof and adapted to provide for horizontal pivotal movement of said torch.

4. An adjustable torch holder for cutting angles on pipe and tubing comprising, in combination, a base plate having means for longitudinal adjustment with respect to the work, a protractor disk formed with a circular groove and graduations along said groove adjustably fixed to the base plate, an indicator plate pivotally superposed on the said protractor disk and capable of fixed adjustment with respect thereto, a torch supporting structure comprising a plurality of pivotally joined arms in longitudinal arrangement and having pivotal connection with the said indicator plate, the said arms being capable of variable rigid positions with respect to the said indicator plate and to each other, a graduated bar pivotally connected to the outer end of the said structure having a torch holder slidably arranged thereon and capable of fixed adjustment, said holder having pivotal association with said torch.

5. In a holder for a cutting torch for cutting various angles on pipe and tubing, in combination a base plate having means for adjustment with respect to the work, a circular protractor plate formed with a circular groove and graduations in its face adjustably connected to said base, an indicator plate pivotally superposed on said protractor plate and capable of fixed adjustment with respect thereto, a torch supporting bracket comprising a plurality of pivotally and longitudinally associated arms pivotally connected to the said indicator and capable of adjustment to fixed angular planes with respect thereto and to each other, a holder bar pivotally connected to the outer end of the said bracket and having graduations thereon and a torch holder slidably arranged for fixed adjustments along the said bar.

DONALD L. FORREST.

REFERENCES CITED

The following references are of record in the file of this patent:

UNITED STATES PATENTS

| Number | Name | Date |
| --- | --- | --- |
| 936,769 | Flower | Oct. 12, 1909 |
| 1,907,956 | Gerber | May 9, 1933 |